(12) United States Patent
Luo et al.

(10) Patent No.: US 12,149,642 B2
(45) Date of Patent: Nov. 19, 2024

(54) LIGHTWEIGHT IDENTITY AUTHENTICATION METHOD BASED ON PHYSICAL UNCLONABLE FUNCTION

(71) Applicant: Zhejiang Lab, Zhejiang (CN)

(72) Inventors: Hanguang Luo, Zhejiang (CN); Tao Zou, Zhejiang (CN); Shunbin Li, Zhejiang (CN); Qi Xu, Zhejiang (CN); Huifeng Zhang, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 313 days.

(21) Appl. No.: 17/876,553

(22) Filed: Jul. 29, 2022

(65) Prior Publication Data

US 2023/0020947 A1  Jan. 19, 2023

Related U.S. Application Data

(63) Continuation of application No. PCT/CN2022/081120, filed on Mar. 16, 2022.

(30) Foreign Application Priority Data

Jul. 8, 2021 (CN) .......................... 202110771857.3

(51) Int. Cl.
*H04L 9/32* (2006.01)
*H04L 9/06* (2006.01)
*H04L 9/08* (2006.01)

(52) U.S. Cl.
CPC .......... *H04L 9/3278* (2013.01); *H04L 9/0643* (2013.01); *H04L 9/0866* (2013.01)

(58) Field of Classification Search
CPC .... H04L 9/3278; H04L 9/0643; H04L 9/0866
See application file for complete search history.

(56) References Cited

U.S. PATENT DOCUMENTS 9,264,235 B2 * 2/2016 Truskovsky .......... H04L 9/3263
9,773,419 B1 * 9/2017 Gordon ................ G08G 5/0013
(Continued)

FOREIGN PATENT DOCUMENTS

CN  113068187 A * 7/2021 ........... H04L 9/3278
CN  113282898 A * 8/2021 ............. G06F 21/31

*Primary Examiner* — Yonas A Bayou
(74) *Attorney, Agent, or Firm* — JCIPRNET

(57) ABSTRACT

The present disclosure belongs to an identity authentication technology in network security field, and relates to a lightweight identity authentication method. The method utilizes lightweight operations of the physical unclonable function, Hash operation, XOR operation, etc. for bidirectional authentication between an authentication server and an Internet of Things resource-limited device, and particularly utilizes uniqueness of an integrated circuit (IC) physical microstructure created by the physical unclonable function in the resource-limited device in a manufacturing process to design an engineering-implementable information desynchronization recovery mechanism of two authentication parties by optimizing an interaction mode of input challenge and output response of the physical unclonable function, thereby solving the problem that the same lightweight identity authentication type solution cannot ensure forward security and resist desynchronization attack, further reducing resource cost for an identity authentication process, and effectively improving security and operation efficiency of identity authentication of the Internet of Things resource-limited device.

2 Claims, 2 Drawing Sheets

(56) References Cited

U.S. PATENT DOCUMENTS

| | | | | |
|---|---|---|---|---|
| 10,958,452 B2* | 3/2021 | Wallrabenstein | ..... | H04L 9/3257 |
| 11,194,094 B2* | 12/2021 | Baer | .................. | G02B 6/02347 |
| 11,271,757 B2* | 3/2022 | Anzai | ................... | H04L 9/0877 |
| 11,283,633 B2* | 3/2022 | Cambou | ............... | H04L 9/0861 |
| 11,496,326 B2* | 11/2022 | Cambou | ............... | H04L 9/0866 |
| 2010/0293612 A1* | 11/2010 | Potkonjak | ............. | H04L 9/3278 |
| | | | | 726/20 |

* cited by examiner

LIGHTWEIGHT IDENTITY AUTHENTICATION METHOD BASED ON PHYSICAL UNCLONABLE FUNCTION

CROSS-REFERENCE TO RELATED APPLICATION

This application is a continuation of international application of PCT application serial no. PCT/CN2022/081120 filed on Mar. 16, 2022, which claims the priority benefit of China application no. 202110771857.3 filed on Jul. 8, 2021. The entirety of each of the mentioned above patent applications is hereby incorporated by reference herein and made a part of this specification.

TECHNICAL FIELD

The present disclosure belongs to an identity authentication technology in the field of network security, which relates to a lightweight identity authentication method based on a physical unclonable function.

BACKGROUND ART

With the continuous development of the technology of Internet of Things, major developed countries in the world have launched a new round of industrial revolution based on the technology of Internet of things. The United States firstly proposed the concept of "Industrial Internet of Things (IIoT)" in 2012, which applied the technology of Internet of Things to the high-end manufacturing industry, so as to achieve the purpose of revitalizing the American manufacturing industry. The Germany proposed the strategy "Industry 4.0" in 2013, which achieved generational change from the traditional manufacturing factory to the intelligent factory by constructing an information Internet of Things system. China also released the strategy plan "Made in China 2025" in 2015, which pointed out "promoting deep fusion between new-generation information technologies such as Internet of Things and big data and the traditional manufacturing industry, and promoting transformation and upgrading from the traditional manufacturing industry to intelligent manufacturing". Thus, it can be seen that the IIoT is the trend and key of future industrial development, which achieves evolution from the traditional industry to intelligence by means of ubiquitous interconnection and interoperability.

In order to achieve deep data sharing in IIoT system application, data interaction among different systems may be achieved by means of an open network, and high information opening certainly brings about hidden dangers to the security of the network, which mainly relates to security problems of information secrecy, data transmission, etc. Identity authentication is the process of confirming real identities of two parties in the communication process, which can effectively prevent conditions of forgery, counterfeit, etc. Presently, the mainstream mode in the industry is to utilize the cryptography technology to authenticate the identity, which includes symmetric encryption algorithm, asymmetric encryption algorithm, etc. However, in a machine to machine (M2M) communication system of the IIoT, there are resource-limited terminal devices such as massive wireless sensors and radio frequency identification tags, which usually have the characteristics of poor processing power, low computing power, small storage space, limited energy supply, etc., and therefore, traditional complex encryption algorithms may not be applied to the resource-limited terminal devices above. In order to give full play to the potential of IIoT intelligence, interconnection, etc., it is necessary to design a lightweight identity authentication technology and method suitable for a resource-limited system.

The physical unclonable function (PUF) is produced by an integrated circuit (IC) inherent in the device, which utilizes the uniqueness of the physical microstructure of the IC created in the manufacturing process to ensure that there are not two devices having the same PUF, and has the advantages of low operational cost, easy implementation, etc. When the PUF is used for authenticating the identity, the corresponding challenge-response pair (CRP) is utilized to authenticate the identity of the target device, where the challenge message C is input into the PUF of the target device in the form of a string, and then the PUF generates a response output R uniquely corresponding to the input string, i.e., R=PUF(C), and the identity of the target device is authenticated by determining whether the response R is correct. Due to PUF-based identity authentication, in digital communication, it is necessary to interact a challenge and a response between the authentication device and the authenticated device in the form of a bit string, and how to obtain and update the challenge-response pair and ensure the confidentiality of a challenge-response message in the acquisition and authentication process is the key to achieve the identity security authentication of the device. The existing same type of lightweight identity authentication methods have the problems of low efficiency, insufficient security, poor engineering implementability, etc.

In order to solve the technical problem above in the prior art, the present disclosure provides a lightweight identity authentication method based on a physical unclonable function.

SUMMARY a lightweight identity authentication method based on a physical unclonable function includes two processes of device registration and device registration based identity authentication, where the process of device registration includes: step A1: sending, by an authentication server, a random challenge string and a temporary identity identifier, which are generated by the authentication server, to a target resource-limited device; step A2, generating, by the target resource-limited device, a corresponding response string, and sending, by the target resource-limited device, the response string to the authentication server; and step A3, saving, by the authentication server, a corresponding security authentication item for the target resource-limited device according to the random challenge string, the temporary identity identifier and the response string; and the process of identity authentication includes: sending, by resource-limited devices, random numbers generated by the target resource-limited devices and temporary identity identifiers of the resource-limited devices to the authentication server; and then, validating, by the resource-limited devices, the authentication server sequentially according to security authentication items retrieved by the authentication server, and validating and saving, by the authentication server, a next round of authentication information to complete one-time bidirectional identity authentication.

Further, step A1 specifically includes: generating, by the authentication server, a random challenge string $C_j^1$ and a temporary identity identifier $TID_j^1$ for a j-th resource-limited device, and then sending, by the authentication server, the random challenge string and the temporary identity identifier to the target resource-limited device, superscripts of $C_j^1$ and $TID_j^1$ representing a round of an identity authentication phase, and subscripts of $C_j^1$ and $TID_j^1$ representing a serial number of the target resource-limited device.

Further, step A2 specifically includes: receiving, by the target resource-limited device, $C_j^1$ and $TID_j^1$ sent by the authentication server, saving, by the target resource-limited device, $TID_j^1$, and then utilizing, by the target resource-limited device, $C_j^1$ and a physical unclonable function (PUF) unique to the target resource-limited device to generate a corresponding response string $R_j^1$, i.e., $R_j^1=PUF(C_j^1)$; and finally, saving, by the resource-limited $C_j^1$, and sending, by the resource-limited device, the response string $R_j^1$ to the authentication server.

Further, step A3 specifically includes: receiving, by the authentication server, the corresponding string $R_j^1$, and saving, by the authentication server, the corresponding security authentication item $\{C_j^1, R_j^1, TID_j^1\}$ for the j-th resource-limited device.

Further, the process of identity authentication specifically includes:

step B1, generating, by the resource-limited device, the random number $N_d$, computing the temporary identity identifier $TID_j^1$ corresponding to the resource-limited device, and then sending $N_d$ and $TID_j^1$ to the authentication server;

step B2, receiving, by the authentication server, $N_d$ and $TID_j^1$, retrieving, by the authentication server, whether there is the corresponding security authentication item in a database by means of $TID_j^1$, and under the condition that there is the corresponding security authentication item, generating, by the authentication server, a random number $N_s$, and utilizing, by the authentication server, the response string in the corresponding authentication item to compute authentication information $V_1=h(R_j^1\|N_s\|N_d)$, h representing Hash operation, and ∥ being a string connection operator; and finally, sending, by the authentication server, $N_s$ and $V_1$ to the corresponding resource-limited device, and under the condition that there is no corresponding security authentication item, terminating, by the authentication server, this authentication process;

step B3, receiving, by the resource-limited device, a message sent by the authentication server, utilizing, by the resource-limited device, the challenge string $C_j^1$ and the physical unclonable function to generate a response string $R_j^1$ of a current round of security identity authentication, then computing, by the resource-limited device, corresponding authentication information $V'_1$, comparing, by the resource-limited device, whether the authentication information is equal to $V_1$ received and sent by the authentication server, and under the condition that the authentication information is unequal to $V_1$ received and sent by the authentication server, terminating a current round of authentication process; and otherwise, computing, by the resource-limited device, $C_j^{i+1}=h(C_j^1\|R_j^1\|N_d\|N_s)$, $R_j^{i+1}=PUF(C_j^{i+1})$, $(R_j^{i+1})^*=R_j^{i+1}\oplus j^{i+1}$, and $V_2=h(C_j^{i+1}\|(R_j^{i+1})^*)$, and then sending, by the resource-limited device, $(R_j^{i+1})^*$ and $V_2$ to the authentication server;

step B4, receiving, by the authentication server, the corresponding message, computing, by the authentication server, $C_j^{i+1}=h(C_j^i\|R_j^i\|N_d\|N_s)$ and $V'_2=h(C_j^{i+1}\|(R_j^{i+1})^*)$ and, then comparing, by the authentication server, whether $V'_2$ is equal to $V_2$ received, and under the condition that $V'_2$ is unequal to $V_2$ received, terminating the current round of security identity authentication process; and otherwise, computing, by the authentication server, $R_j^{i+1}=(R_j^{i+1})^*\oplus C_j^{i+1}$ and $TID_j^{i+1}=h(TID_j^i\|C_j^{i+1})$, saving and updating, by the authentication server, the security authentication item $\{C_j^{i+1}, R_j^{i+1}, TID_j^{i+1}\}$ for next authentication; and step B5, in authentication rounds except for the first round of authentication (i.e., i>1), under the condition that the resource-limited device causes termination of the authentication process by the authentication server in step B2 by means of the request authentication information sent in step B1 for the first time, that is, the authentication server does not retrieve the corresponding authentication item by means of the temporary identifier, directly selecting, by the resource-limited device, $TID_j^{i-1}$ as the temporary identity identifier of the current round, generating, by the resource-limited device, a new random number $N_d$, and then repeating, by the resource-limited device, steps B1 to B4 to complete the authentication process.

Further, the manner of obtaining the temporary identity identifier by the resource-limited device includes: (1) when the identity authentication process is carried out for the first time, i.e., i=1, directly obtaining $TID_j^1$ from a memory of the resource-limited device; and (2) when the identity authentication process is not carried out for the first time, i.e., i>1, obtaining the temporary identity identifier $TID_j^i h(TID_j^{i-1}\|C_j^i)$ by a temporary identity identifier $TID_j^{i-1}$ in a previous round of authentication and the challenge string $C_j^i$ of the current round by means of Hash operation, and then sending, by the resource-limited device, $N_d$ and $TID_j^i$ to the authentication server.

DETAILED DESCRIPTION OF THE EMBODIMENTS

In order to make the objectives, technical solutions and technical effects of the present disclosure clearer, the present disclosure will be further described in detail below in combination with the drawings of the description.

A lightweight identity authentication method based on a physical unclonable function specifically includes two processes of device registration and identity authentication.

Figure 1:
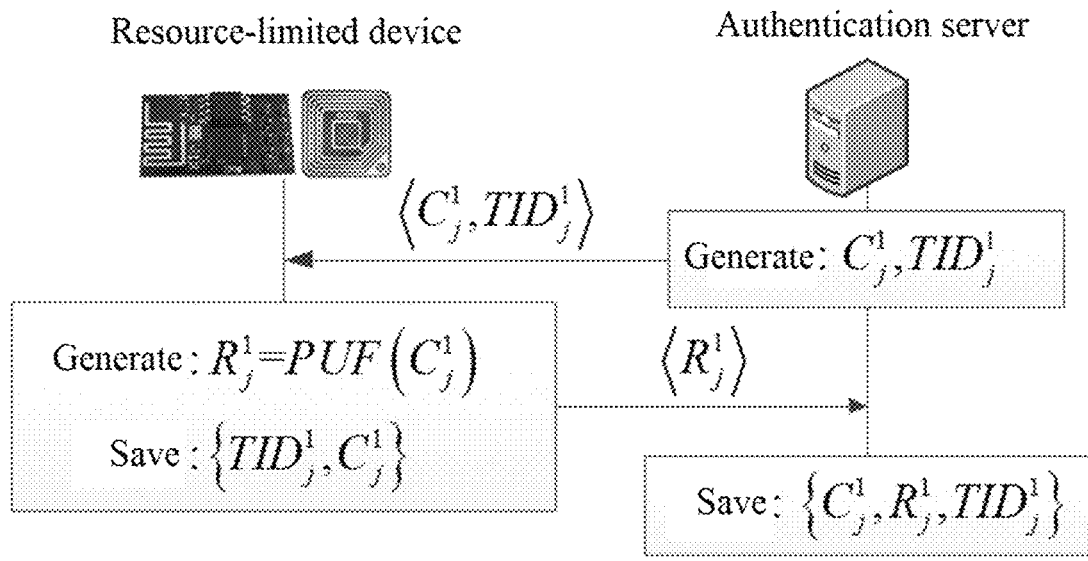
FIG. 1 is a data interaction diagram of a registration process of a resource-limited device of the present disclosure on an authentication server.
Figure 2:
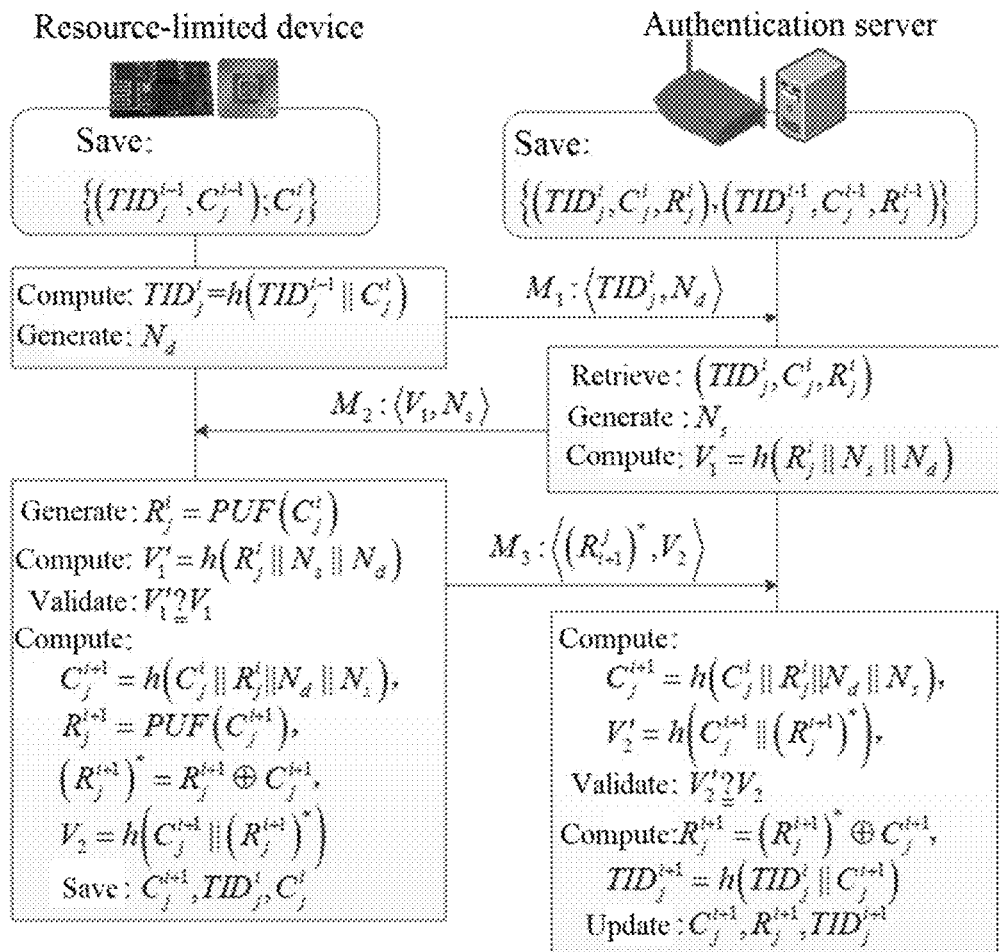
FIG. 2 is a data interaction diagram of bidirectional identity authentication between the resource-limited device and an authentication server.

As shown in FIG. 1, the process of data interaction of a device registration phase of the lightweight identity authentication method based on a physical unclonable function of the present disclosure mainly achieves that a resource-limited device is registered in an authentication server through Internet and a gateway, and identity authentication secret information between the resource-limited device and the authentication server, i.e., a challenge-response pair, C and R, of the physical unclonable function on the corresponding resource-limited device, is initialized and synchronized, and the registration process carries out data interaction between the resource-limited device and the authentication server by means of a security channel, a detailed process is shown in FIG. 2, which includes as follows:

step A1: generate, by the authentication server, a random challenge string $C_j^1$ and a temporary identity identifier $TID_j^1$ for a j-th resource-limited device, and then send, by the authentication server, the random challenge string and the temporary identity identifier to the target resource-limited device, superscripts of $C_j^1$ $TID_j^1$ and representing a round of an identity authentication phase, and subscripts of $C_j^1$ and $TID_j^1$ representing a serial number of the target resource-limited device;

step A2: receive, by the target resource-limited device, $C_j^1$ and $TID_j^1$ sent by the authentication server, save, by the target resource-limited device, $TID_j^1$, and then utilize, by the target resource-limited device, $C_j^1$ and a physical unclonable function (PUF) unique to the target resource-limited device to generate a corresponding response string $R_j^1$, i.e., $R_j^1 = PUF(C_j^1)$; and finally, save, by the resource-limited device, $C_j^1$, and send, by the resource-limited device, the response string $R_j^1$ to the authentication server; and step A3: receive, by the authentication server, the response string $R_j^1$, and save, by the authentication server, the corresponding security authentication item $\{C_j^1, R_j^1, TID_j^1\}$ for the j-th resource-limited device.

Figure 3:
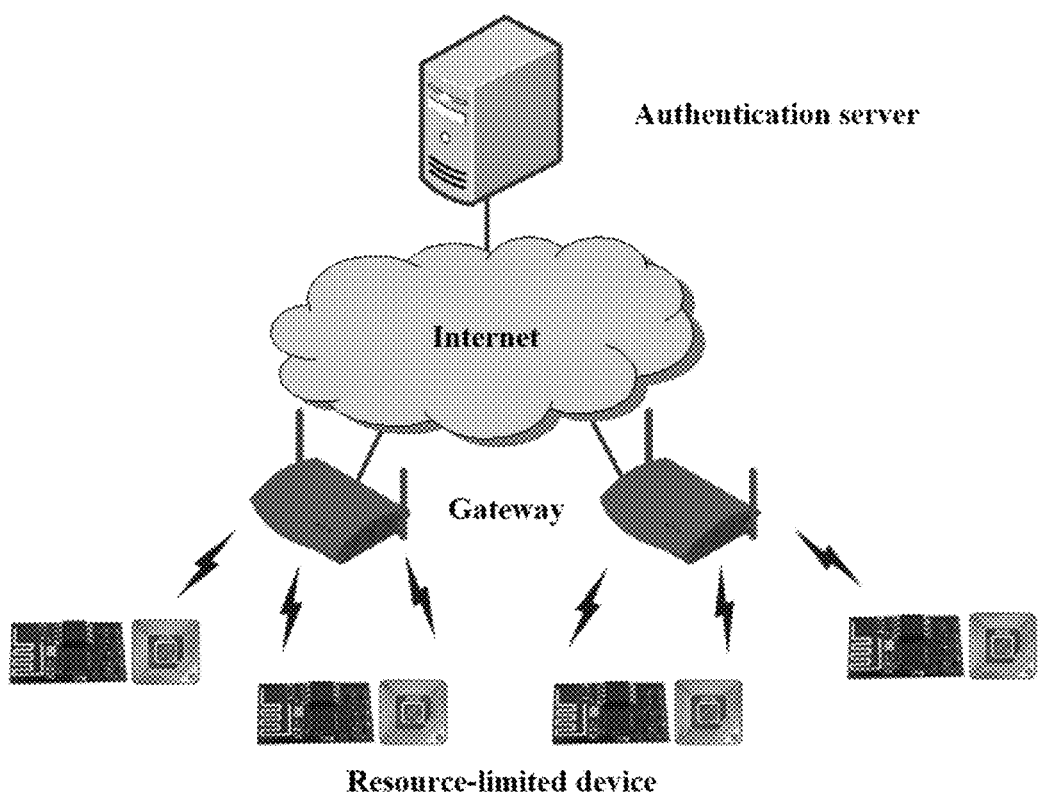
FIG. 3 is a system frame diagram of the present disclosure.

As shown in FIGS. 2 and 3, the identity authentication process is carried out on the basis that the authentication server completes the registration process for the resource-limited device, which includes:

step B1: generate, by the resource-limited device, a random number $N_d$, compute the temporary identity identifier $TID_j^i$ of the resource-limited device, and then send $N_d$ and $TID_j^i$ to the authentication server;

the manner of obtaining the temporary identity identifier by the resource-limited device is divided into the following two conditions: (1) when the identity authentication process is carried out for the first time, i.e., i=1, directly obtain $TID_j^1$ from a memory of the resource-limited device; and (2) when the identity authentication process is not carried out for the first time, i.e., i>1, obtain the temporary identity identifier $TID_j^i = h(TID_j^{i-1}\|C_j^i)$ by a temporary identity identifier $TID_j^{i-1}$ in a previous round of authentication and the challenge string $C_j^i$ of the current round by means of Hash operation, h representing Hash operation, and ‖ being a string connection operator, and then send, by the resource-limited device, $N_d$ and $TID_j^i$ to the authentication server;

step B2, receive, by the authentication server, $N_d$ and $TID_j^i$, retrieve, by the authentication server, whether there is the corresponding security authentication item in a database by means of $TID_j^i$, and under the condition that there is the corresponding security authentication item, generate, by the authentication server, a random number $N_s$, and utilize, by the authentication server, the response string in the corresponding authentication item to compute authentication information $V_1 = h(R_j^i\|N_s\|N_d)$, and finally, send, by the authentication server, $N_s$ and $V_1$ to the corresponding resource-limited device, and under the condition that there is no corresponding security authentication item, terminate, by the authentication server, this authentication process;

step B3: receive, by the resource-limited device, a message sent by the authentication server, utilize, by the resource-limited device, the challenge string $C_j^i$ and the physical unclonable function to generate a response string $R_j^i$ of a current round of security identity authentication, then compute, by the resource-limited device, corresponding authentication information $V'_1$, compare, by the resource-limited device, whether the authentication information is equal to $V_1$ received and sent by the authentication server, and under the condition that the authentication information is unequal to $V_1$ received and sent by the authentication server, terminate a current round of authentication process; and otherwise, compute, by the resource-limited device, $C_j^{i+1} = h(C_j^i\|R_j^i\|N_d\|N_s)$, $R_j^{i+1} = PUF(C_j^{i+1})$, $(R_j^{i+1})^* = R_j^{i+1} \oplus C_j^{i+1}$, and $V_2 = h(C_j^{i+1}\|(R_j^{i+1})^*)$, and then send, by the resource-limited device, $(R_j^{i+1})^*$ and $V_2$ to the authentication server;

step B4, receive, by the authentication server, the corresponding message, compute, by the authentication server, $C_j^{i+1} = h(C_j^i\|R_j^i\|N_d\|N_s)$ and $V'_2 = h(C_j^{i+1}\|(R_j^{i+1})^*)$, then compare, by the authentication server, whether $V'_2$ is equal to $V_2$ received, and under the condition that $V'_2$ is unequal to $V_2$ received, terminate the current round of security identity authentication process; and otherwise, compute, by the authentication server, $R_j^{i+1} = (R_j^{i+1})^* \oplus C_j^{i+1}$ and $TID_j^{i+1} = h(TID_j^i\|C_j^{i+1})$, save and update, by the authentication server, the security authentication item $\{C_j^{i+1}, R_j^{i+1}, TID_j^{i+1}\}$ for next authentication; and step B5, in authentication rounds except for the first round of authentication, i.e., i>1, under the condition that the resource-limited device causes termination of the authentication process by the authentication server in step B2 by means of the request authentication information sent in step B1 for the first time, that is, the authentication server does not retrieve the corresponding authentication item by means of the temporary identifier, directly select, by the resource-limited device, $TID_j^{i-1}$ as the temporary identity identifier of the current round, generate, by the resource-limited device, a new random number $N_d$, and then repeat, by the resource-limited device, steps B1 to B4 to complete the authentication process.

The present disclosure simultaneously saves current authentication round and previous authentication items of each of the resource-limited devices at an authentication server side, i.e., $\{C_j^i, R_j^i, TID_j^i\}$ and $\{C_j^{i-1}, R_j^{i-1}, TID_j^{i-1}\}$, and stores the challenge string $C_j^{i-1}$ of the previous round, the temporary identity identifier $TID_j^{i-1}$ and the challenge string $C_j^i$ of the current round in the resource-limited device. The problem of authentication information synchronization loss caused by spontaneous loss or malicious blocking of the authentication messages may be effectively solved by using the above differentiation manner to distinguish storage of authentication messages at an authentication server side and a resource-limited device side in combination with bidirectional authentication steps from B1 to B5, such that DoS attack caused by synchronization loss may be effectively ensured while storage, computation and communication resource cost of the resource-limited device is reduced.

In order to validate the security of the identity authentication method of the present disclosure, the security of the method of the present disclosure is validated by means of a security protocol analysis tool, automated validation of Internet security-sensitive protocols and applications (AVISPA), the method of the present disclosure is simulated by means of an AVISPA background analysis tool, an on-the-fly model-checker (OFMC), and the security of the method of the present disclosure is proved by a result.

The method of the present disclosure is compared with other methods of the same type, which include:

method 1, which sees literature: A. Esfahani et al., "A lightweight authentication mechanism for M2M communication in industrial IoT environment," IEEE Int. Things J., vol. 6, no. 1, pp. 288-296, August 2017;

method 2, which sees literature: S. Kardas et al., "Puf-enhanced offline RFID security and privacy," J. Netw. Comput. Appl., vol. 35, no. 6, pp. 2059-2067, November 2012;

method 3, which sees literature: M. Akgun and M. U. Caglayan, "Providing destructive privacy and scalability in RFID systems using PUFs," Ad Hoc Netw., vol. 32, pp. 32-42, September 2015; and method 4, which sees literature: P. Gope et al., "Lightweight and practical anonymous authentication protocol for RFID systems using physical unclonable functions," IEEE Trans. Inf. Forensics Security, vol. 13, no. 11, pp. 2831-2843, 2018.

The method of the present disclosure compares with the methods above in terms of security, operation efficiency, usability, etc., and comparison results are as follows:

TABLE 1

Comparison of the Required Security Properties (SP)

| Solution name | SP1 | SP2 | SP3 | SP4 | SP5 |
|---|---|---|---|---|---|
| Method 1 | Presence | Absence | Absence | Absence | — |
| Method 2 | Presence | Presence | Presence | Absence | Absence |
| Method 3 | Presence | Presence | Presence | Absence | — |
| Method 4 | Presence | Presence | Presence | Presence | Limited |
| Method of the present disclosure | Presence | Presence | Presence | Presence | Presence |

SP1: bidirectional authentication;
SP2: untraceability;
SP3: unclonability;
SP4: forward security; and
SP5: resistance to DoS attacks Table 1 shows comparison results of security properties between the method of the present disclosure and other methods of the same type, where the solution of the present disclosure satisfies the basic security function required for identity authentication, and method 4 has limited defense against DoS attack. Several "synchronous pairs" are pre-stored in the authentication server and the resource-limited device in method 4, one "synchronous pair" is consumed every time the authentication server and the resource-limited device are subjected to the DoS attack, and therefore, the DoS attack may not be resisted after the "synchronous pairs" are consumed. In addition, it pre-stores a large number of "synchronous pairs" in the resource-limited device and the authentication server in method 4, which may additionally increase storage cost of the resource-limited device.

TABLE 2

Comparison of the Computational Cost

| SOLUTION NAME | RESOURCE-LIMITED DEVICE | AUTHENTICATION SERVER |
|---|---|---|
| METHOD 1 | 7H + RNG | 6H + RNG |
| METHOD 2 | 5H + 2P + RNG | 4H + RNG |
| METHOD 3 | 4H + 2P + RNG | 4H + RNG |
| METHOD 4 | 5H + 2P + RNG | 5H + RNG |
| METHOD OF THE PRESENT DISCLOSURE | 4H + 2P + RNG | 4H + RNG |

Table 2 shows comparison results of computational cost between the method of the present disclosure and other methods of the same type, where H represents Hash operation, P represents a physical unclonable function, and RNG represents a random number generator. With the method of the present disclosure as an example, the resource-limited device side needs to perform four times of Hash operation, two times of physical unclonable function operation and one time of random number generation in order to complete a round of identity authentication. It may be seen from table 2 that the computational cost of the present disclosure is less than or equal to that of other solutions of the same type.

TABLE 3

Comparison of the Other Cost

| SOLUTION NAME | STORAGE COST OF RESOURCE-LIMITED DEVICE | TOTAL COMMUNICATION COST | SYNCHRONOUS RECOVERY COMPLEXITY |
|---|---|---|---|
| METHOD 1 | 384-bit | 1024-bit | — |
| METHOD 2 | 768-bit | 1480-bit | — |
| METHOD 3 | 512-bit | 896-bit | — |
| METHOD 4 | $128 + n * 64$-bit | 832-bit | $O(N)$ |
| METHOD OF THE PRESENT DISCLOSURE | 384-bit | 768-bit | $O(1)$ |

Table 3 shows comparison results of other cost needing to be focused between the method of the present disclosure and other methods of the same type, which includes storage cost, communication cost and synchronous recovery complexity of the resource-limited device. It may be seen from tables 1, 2 and 3 that the present disclosure effectively reduces computational and communication cost of two communication parties while improving authentication security.

The present disclosure has the beneficial effects as follows:

the present disclosure utilizes lightweight operations of the PUF, the Hash operation, XOR operation, etc. to achieve bidirectional authentication between the authentication server and the Internet of Things resource-limited device, and particularly utilizes uniqueness of an integrated circuit (IC) physical microstructure created by the PUF (IC) in the resource-limited device in a manufacturing process to design an engineering-implementable information desynchronization recovery mechanism of two authentication parties by optimizing an interaction mode of input (challenge) and output (response) of the PUF, thereby effectively solving the problem that the same type of lightweight identity authentication solution may not effectively ensure forward security and resist desynchronization attack, further reducing resource cost of the resource-limited device for an identity authentication process, and effectively improving security and operation efficiency of identity authentication of the Internet of Things resource-limited device.

It will be apparent to those skilled in the art that various modifications and variations can be made to the structure of the disclosure without departing from the scope or spirit of the disclosure. In view of the foregoing, it is intended that the present disclosure cover modifications and variations of this disclosure provided they fall within the scope of the following claims and their equivalents.

What is claimed is:

1. A lightweight identity authentication method based on a physical unclonable function, comprising process of device registration and process of device registration based identity authentication, wherein the process of device registration comprises:
   sending, by an authentication server, a random challenge string and a temporary identity identifier, which are generated by the authentication server, to a target resource-limited device, further comprises:
      generating, by the authentication server, a random challenge string $C_j^1$ and a temporary identity identifier $TID_j^1$ for a j-th resource-limited device, and then
      sending, by the authentication server, the random challenge string and the temporary identity identifier to the target resource-limited device, superscripts of the random challenge string $C_j^1$ and the temporary identity identifier $TID_j^1$ representing a round of an identity authentication phase, and subscripts of the random challenge string $C_j^1$ and the temporary identity identifier $TID_j^1$ representing a serial number of the target resource-limited device;
   generating, by the target resource-limited device, a corresponding response string, and sending, by the target resource-limited device, the response string to the authentication server, further comprises:
      receiving, by the target resource-limited device, the random challenge string $C_j^1$ and the temporary identity identifier $TID_j^1$ sent by the authentication server, saving, by the target resource-limited device, the temporary identity identifier $TID_j^1$, and then utilizing, by the target resource-limited device, the random challenge string $C_j^1$ and a physical unclonable function (PUF) unique to the target resource-limited device to generate the corresponding response string $R_j^1$, i.e., $R_j^1=PUF(C_j^1)$; and finally,
      saving, by the resource-limited device, the random challenge string $C_j^1$ and sending, by the resource-limited device, the response string $R_j^1$ to the authentication server; and
   saving, by the authentication server, a corresponding security authentication item for the target resource-limited device according to the random challenge string, the temporary identity identifier and the response string, further comprises:
      receiving, by the authentication server, the corresponding string $R_j^1$, and saving, by the authentication server, the corresponding security authentication item $\{C_j^1, R_j^1, TID_j^1\}$ for the j-th resource-limited device,
   wherein the process of identity authentication comprises:
   sending, by resource-limited devices, random numbers generated by the resource-limited devices and temporary identity identifiers of the resource-limited devices to the authentication server;
   validating, by the resource-limited devices, the authentication server sequentially according to security authentication items retrieved by the authentication server, and validating and saving, by the authentication server, a next round of authentication information to complete one-time bidirectional identity authentication,
   generating, by the resource-limited device, a first random number $N_d$, computing the temporary identity identifier $TID_j^i$ corresponding to the resource-limited device, and then sending the first random number $N_d$ and the temporary identity identifier $TID_j^i$ to the authentication server, and a manner of obtaining the temporary identity identifier by the resource-limited device;
   receiving, by the authentication server, the first random number $N_d$ and the temporary identity identifier $TID_j^i$, retrieving, by the authentication server, whether there is the corresponding security authentication item in a database by means of the temporary identity identifier $TID_j^i$, and under the condition that there is the corresponding security authentication item, generating, by the authentication server, a second random number $N_s$, and utilizing, by the authentication server, the response string in the corresponding authentication item to compute a authentication information $V_1=h(R_j^i\|N_s\|N_d)$, h representing Hash operation, and $\|$ being a string connection operator; and finally, sending, by the authentication server, the second random number $N_s$ and the authentication information $V_1$ to the corresponding resource-limited device, and under the condition that there is no corresponding security authentication item, terminating, by the authentication server, this authentication process;
   receiving, by the resource-limited device, a message sent by the authentication server, utilizing, by the resource-limited device, the random challenge string $C_j^i$ and the physical unclonable function to generate the response string $R_j^i$ of a current round of security identity authentication, then computing, by the resource-limited device, a corresponding authentication information $V'_1$, comparing, by the resource-limited device, whether the authentication information is equal to the corresponding authentication information $V_1$ received and sent by the authentication server, and under the condition that the authentication information is unequal to the corresponding authentication information $V_1$ received and sent by the authentication server, terminating a current round of authentication process; and otherwise, computing, by the resource-limited device, $C_j^{i+1}=h(C_j^i\|R_j^i\|N_d\|N_s)$, $R_j^{i+1}=PUF(C_j^{i+1})$, $(R_j^{i+1})^*=R_j^{i+1}\oplus_j^{i+1}$, and $V_2=h(C_j^{i+1}\|(R_j^{i+1})^*)$, and then sending, by the resource-limited device, $(R_j^{i+1})^*$ and $V_2$ to the authentication server;
   receiving, by the authentication server, the corresponding message, computing, by the authentication server, $C_j^{i+1}=h(C_j^i\|R_j^i\|N_d\|N_s)$ and $V'_2=h(C_j^{i+1}\|(R_j^{i+1})^*)$, then comparing, by the authentication server, whether $V'_2$ is equal to $V_2$ received, and under the condition that $V'_2$ is unequal to $V_2$ received, terminating the current round of security V, identity authentication process; and otherwise, computing, by the authentication server, $R_j^{i+1}=(R_j^{i+1})^*\oplus C_j^{i+1}$ and $TID_j^{i+1}=h(TID_j^i\|C_j^{i+1})$, saving and updating, by the authentication server, the security authentication item $\{C_j^{i+1}, R_j^{i+1}, TID_j^{i+1}\}$ for next authentication; and
   in authentication rounds except for the first round of authentication, i.e., i>1, under the condition that the resource-limited device causes termination of the authentication process by the authentication server in step B2 by means of the request authentication information sent in step B1 for the first time, that is, the authentication server does not retrieve the corresponding authentication item by means of the temporary identifier, directly selecting, by the resource-limited device, $TID_j^{i-1}$ as the temporary identity identifier of the current round, generating, by the resource-limited device, a third random number $N_d$, and then repeating, by the resource-limited device, steps B1 to B4 to complete the authentication process.

2. The lightweight identity authentication method based on a physical unclonable function of claim 1, wherein the manner of obtaining the temporary identity identifier by the resource-limited device further comprises:

when the identity authentication process is carried out for the first time, i.e., i=1, directly obtaining the temporary identity identifier $TID_j^1$ from a memory of the resource-limited device; and when the identity authentication process is not carried out for the first time, i.e., i>1, obtaining the temporary identity identifier $TID_j^i = h(TID_j^{i-1} \| C_j^i)$ by a second temporary identity identifier $TID_j^{i-1}$ in a previous round of authentication and the challenge string $C_j^i$ of the current round by means of Hash operation, and then sending, by the resource-limited device, the first random number $N_d$ and the temporary identity identifier $TID_j^i$ to the authentication server.

\* \* \* \* \*